(12) United States Patent
Laraqui et al.

(10) Patent No.: US 10,440,761 B2
(45) Date of Patent: Oct. 8, 2019

(54) NODE AND METHOD FOR SECURE CONNECTED VEHICLE SMALL CELLS

(71) Applicant: TELEFONAKTIEBOLAGET LM ERICSSON (PUBL), Stockholm (SE)

(72) Inventors: Kim Laraqui, Solna (SE); Sándor Albrecht, Sundbyberg (SE); Henrik Almeida, Hägersten (SE); Suresh Krishnan, Suwanee, GA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 339 days.

(21) Appl. No.: 15/324,863

(22) PCT Filed: Jul. 10, 2015

(86) PCT No.: PCT/SE2015/050817
§ 371 (c)(1),
(2) Date: Jan. 9, 2017

(87) PCT Pub. No.: WO2016/007083
PCT Pub. Date: Jan. 14, 2016

(65) Prior Publication Data
US 2017/0208508 A1 Jul. 20, 2017

Related U.S. Application Data

(60) Provisional application No. 62/023,209, filed on Jul. 11, 2014.

(51) Int. Cl.
*H04W 36/00* (2009.01)
*H04W 76/12* (2018.01)
(Continued)

(52) U.S. Cl.
CPC ............ *H04W 76/12* (2018.02); *H04L 61/30* (2013.01); *H04L 61/3075* (2013.01);
(Continued)

(58) Field of Classification Search
CPC . H04W 76/12; H04W 76/11; H04W 36/0016; H04W 84/005; H04W 84/045;
(Continued)

(56) References Cited

U.S. PATENT DOCUMENTS

2010/0027419 A1 2/2010 Padhye et al.
2013/0078945 A1 3/2013 Lavi et al.
(Continued)

FOREIGN PATENT DOCUMENTS

EP 2496045 A2 9/2012
WO 2012171585 A1 12/2012
WO 2014009828 A1 1/2014

OTHER PUBLICATIONS

3GPP, "3rd Generation Partnership Project; Technical Specification Group Radio Access Network; Evolved Universal Terrestrial Radio Access (E-UTRA); Relay architectures for E-UTRA (LTE-Advanced) (Release 9)," 3GPP TR 36.806 V2.0.0, Feb. 2010.
(Continued)

*Primary Examiner* — Melvin C Marcelo
(74) *Attorney, Agent, or Firm* — Patent Portfolio Builders, PLLC

(57) ABSTRACT

Example embodiments presented herein are directed towards a Connected Vehicle Small Cell Gateway (CVSC GW) and a backhaul user equipment, as well as corresponding methods therein, for providing a multiple operator radio access in-vehicle split femtocell in a wireless communications network.

20 Claims, 12 Drawing Sheets

(51) Int. Cl.
H04W 76/11 (2018.01)
H04L 29/12 (2006.01)
H04W 84/00 (2009.01)
H04W 84/04 (2009.01)
H04W 88/16 (2009.01)
H04L 29/08 (2006.01)

(52) U.S. Cl.
CPC ........ *H04W 36/0016* (2013.01); *H04W 76/11* (2018.02); *H04L 67/12* (2013.01); *H04W 84/005* (2013.01); *H04W 84/045* (2013.01); *H04W 84/047* (2013.01); *H04W 88/16* (2013.01)

(58) Field of Classification Search
CPC .... H04W 84/047; H04W 88/16; H04L 61/30; H04L 61/3075; H04L 67/12
See application file for complete search history.

(56) References Cited

U.S. PATENT DOCUMENTS

| 2014/0204832 A1* | 7/2014 | Van Phan | H04W 88/10 370/315 |
| 2015/0312824 A1* | 10/2015 | Thalanany | H04W 36/165 455/435.1 |
| 2016/0323796 A1* | 11/2016 | Richter | H04W 36/32 |

OTHER PUBLICATIONS

International Search Report and Written Opinion dated Nov. 5, 2015 in related International Application No. PCT/SE2015/050817.
Office Action issued in application No. 15747252.3; dated Jan. 29, 2019; 09 pages.

* cited by examiner

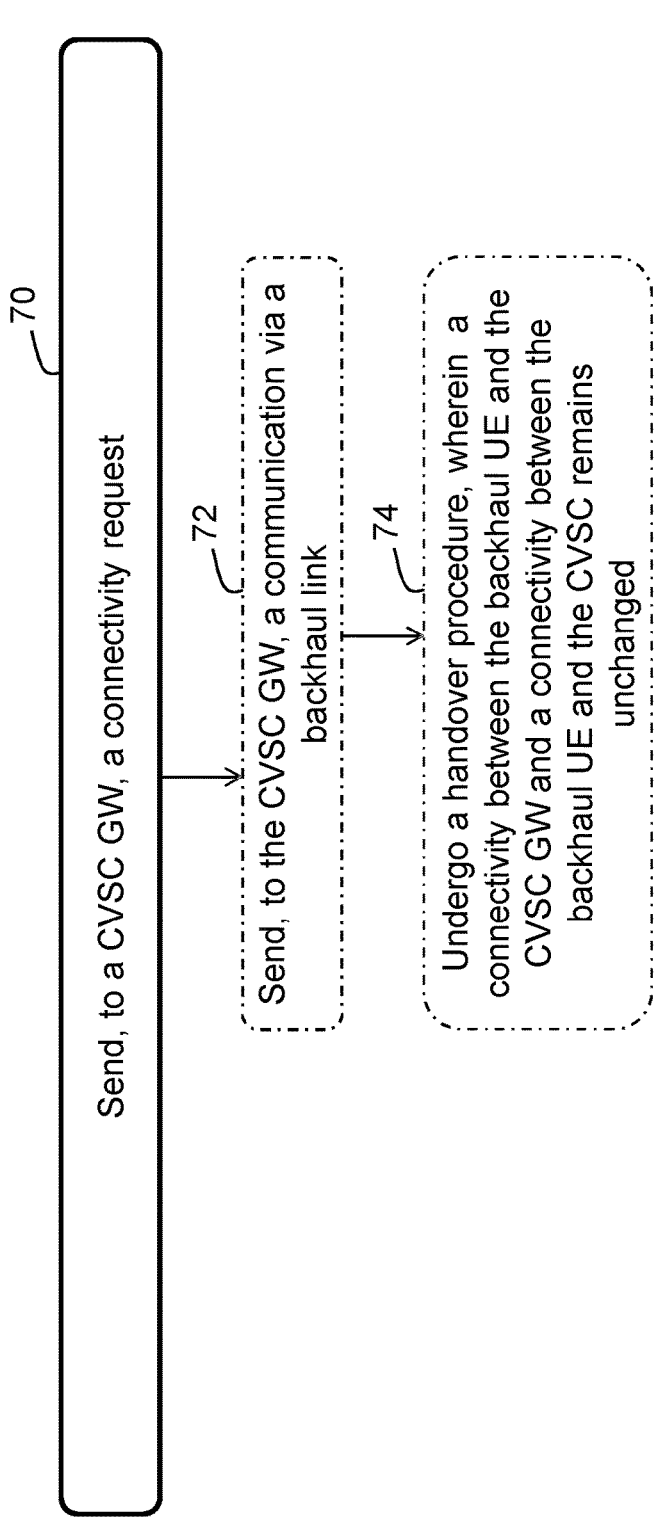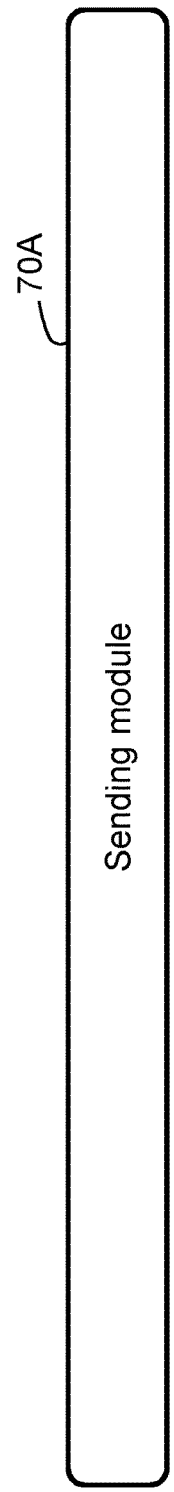
FIGURE 11A
FIGURE 11B

NODE AND METHOD FOR SECURE CONNECTED VEHICLE SMALL CELLS

TECHNICAL FIELD

Example embodiments presented herein are directed towards a Connected Vehicle Small Cell Gateway (CVSC GW) and a backhaul user equipment, as well as corresponding methods therein, for providing a multiple operator radio access in-vehicle split femtocell in a wireless communications network.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

The automotive industry is continuously improving its vehicles in terms of energy efficiency, isolation against external heat/cold etc. One side effect from this is that radio propagation inside the vehicles is becoming a serious challenge that mandates new solutions. Here, some vehicle manufacturers will probably come to the conclusion that "outside-in" radio propagation (e.g. penetration of LTE radio signals from a roadside macro station into the NG vehicles) is not a future proof option. One approach to solve the in-vehicle radio coverage issue is to deploy low-power small cells inside the vehicle.

SUMMARY

In order to solve the issues of in-vehicle 3GPP radio coverage, the deployment of femtocells may be utilized. However, deploying in-vehicle femtocells creates a number of challenges and major issues.

For example, there is no inherent support for multi-operator radio access. This means that a femtocell inside the vehicle will typically only support one mobile operator, and that users inside the vehicle who do are not subscribers to that operator have no access to the in-vehicle network, except for emergency calls (as stipulated by 3GPP standards and regulations). One could envisage multioperator support, but since a femtocell is a full eNodeB (radio base station) is implies that the connection of this eNodeB to the different operators' networks have to abide by one security policy per operator. This is inherently costly and not a viable alternative. Another option is to implement some kind of regional (in-vehicle) roaming agreement in-between the operator controlling the in-vehicle femtocell and other operators, but this is also a cumbersome way to solve the multi-operator issue.

A further example is that a femtocell comprises both radio access network (RAN) and core network (CN) protocols. The transition of cellular user and control data in-between RAN and CN introduces a point inside the eNodeB where this data is available in cleartext (from a 3GPP perspective—it can still be encrypted at the application layer in the cellular phones/mobile terminals) and not integrity protected. At this point, e.g. voice packets can be taped in cleartext. Since the femto resides in a vehicle, attempts will be made by car specialists and others, to tap such data.

Thus, at least one example object of the example embodiments presented herein is to provide an efficient backhauling of a split femtocell (or flexible bearer handling) architecture inside a vehicle.

Accordingly, some of the example embodiments are directed towards method, in a CVSC GW, for providing a multiple operator radio access in-vehicle split femtocell in a wireless communications network. The method comprises receiving, from a backhaul user equipment, a connectivity request for at least one device inside a vehicle and being served by a CVSC, where the connectivity request comprising an indicator. The method further comprises determining the at least one device is configured for communications via the multiple operator radio access in-vehicle split femtocell based on the indicator. The method also comprises terminating communications from the at least one device in a PGW in which the CVSC GW is situated in.

Some of the example embodiments are directed towards a CVSC GW for providing a multiple operator radio access in-vehicle split femtocell in a wireless communications network. The CVSC GW comprises a receiver configured to receive, from a backhaul user equipment, a connectivity request for at least one device inside a vehicle and being served by a CVSC. The connectivity request comprises an indicator. The CVSC GW also comprises a processing unit configured to determine the at least one device is configured for communications via the multiple operator radio access in-vehicle split femtocell based on the indicator. The processing unit is further configured to terminate communications from the at least one device in a PGW in which the CVSC GW is situated in.

Some of the example embodiments are directed towards a method, in a backhaul user equipment, for providing a multiple operator radio access in-vehicle split femtocell in a wireless communications network. The method comprises sending, to a CVSC GW, a connectivity request for at least one device inside a vehicle and being served by a CVSC. The connectivity request comprises an indicator indicating the at least one device is configured for communications via the multiple operator radio access in-vehicle femtocell.

Some of the example embodiments are directed towards a backhaul user equipment for providing a multiple operator radio access in-vehicle split femtocell in a wireless communications network. The backhaul user equipment comprises a transmitter configured to send, to a CVSC GW, a connectivity request for at least one device inside a vehicle and being served by a CVSC. The connectivity request comprises an indicator indicating the at least one device is configured for communications via the multiple operator radio access in-vehicle femtocell.

Some of the example embodiments are directed towards a method and node related to a Connected Vehicle Small Cell (CVSC) Gateway (GW). The CVSC GW may be situated on top of a PDN Gateway and terminates/originates the PDCP PDUs from/to the vehicles. According to some of the example embodiments, a special APN is used to connect the CVSC to the appropriate PDN gateway leading to the CVSC GW. To the core network (Evolved Packet Core, EPC), the CVSC GW can support a number of femto gateway models, e.g. for control plane traffic or user plane traffic or both. When applicable, the CVSC GW can use local-break out on the macro cell site, of PDCP PDUs, for the sake of dual connectivity of in-vehicle cellular devices.

Some of the example embodiments are directed towards multi-operator support at the radio bearer levels of devices connected to the in-vehicle Connected Vehicle Small Cell (which as stated earlier is a "split femtocell").

Some of the example embodiments are directed towards operational methods by which the LTE backhaul link is supported by optionally reusing the existing LTE EPC.

The example embodiments presented herein have the following example advantages. One example advantage is the ability to support a secure small cell inside the vehicles, as compared to non-secure femtocells. A further example advantage is that the small cells need no configuration and much less operations, administration and maintenance, compared to alternative solutions. Yet another example advantage is the reuse of Residential Small Cells (RSC) to implement the Connected Vehicle Small Cells. Another example advantage is that small cell backhauling relies on standard LTE MBH and EPC. Yet another example advantage is that multi-operator support can be achieved inside the vehicle without requiring very complex multi-operator IPSEC setups as would be required for full femtocell solutions in the vehicle. A further example advantage is that any cloud solution can be reused transparently, e.g. the Ericsson Connected Vehicle Cloud business solution. A further example advantage of the example embodiments is allowing for a future tie-in of small moving 3GPP networks to our macro solutions. Yet another example advantage is in-vehicle traffic can be isolated and charged differently depending on operator policies. A further example advantage is Mobile Virtual Network Operator (MVNO) schemes can be supported, e.g. for car manufacturer specific devices that use LTE in-vehicle for machine-type communication. For example, a car manufacturer could get its own worldwide mobile network identity which would enable it to get access to any of its own in-vehicle small cells.

DEFINITIONS

3GPP Third Generation Partnership Project
APN Access Point Name
BCCH Broadcast Control Channel
BH Backhaul
BSC Base Station Controller
CCCH Common Control Channel
CDMA Code Division Multiple Access
CN Core Network
CPU Control Processing Unit
CVSC Connected Vehicle Small Cell
DHCP Dynamic Host Configuration Protocol
DL-SCH Downlink Shared Channel
DRB Data Radio Bearer
E-UTRAN Evolved Universal Terrestrial Radio Access Network
eNodeB Evolved NodeB
EPC Evolved Packet Core
EPS Evolved Packet System
EvDo Evolution Data Optimized
FSM Finite State Machine
GERAN GSM/EDGE Radio Access Network
GGSN Gateway GPRS Support Node
GPRS General Packet Radio Service
GSM Global System for Mobile Communications
GW Gateway
HDLC High Level Data Link Control
HSS Home Subscriber Server
HTTP Hypertext Transfer Protocol
ID Identification
IP Internet Protocol
IPSEC IP Security
LCID Logical Channel Identification
LTE Long Term Evolution
MAC Medium Access Control
MBH Mobile Backhaul
MME Mobility Management Entity
MPLS Multiprotocol Label Switching
MVNO Mobile Virtual Network Operator
OTN Optical Transport Network
PCCH Paging Control Channel
PDCP Packet Data Convergence Protocols
PDH Plesiochronous Digital Hierarchy
PDN Packet Data Network
PDU Protocol Data Unit
PGW PDN Gateway
PHY Physical Layer
PLMN Public Land Mobile Network
RAN Radio Access Network
RBS Radio Base Station
RLC Radio Link Control
RNC Radio Network Controller
ROHC Robust Header Compression
RRC Radio Resource Control
RSC Residential Small Cells
SDH Synchronous Digital Hierarchy
SGSN Serving GPRS Support Node
SGW Serving Gateway
SRB Signaling Radio Bearer
TCP Transmission Control Protocol
UDP User Datagram Protocol
UE User Equipment
UMTS Universal Mobile Telecommunications System
UTRAN UMTS Terrestrial Radio Access Network
WCDMA Wideband Code Division Multiple Access
WiFi Wireless Fidelity

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 11A is a flow diagram depicting example operations performed by the backhaul UE, according to some of the example embodiments; and FIG. 11B is a module diagram of the backhaul UE, according to some of the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN, E-UTRAN, Wi-Fi based system.

System Overview

Figure 1:
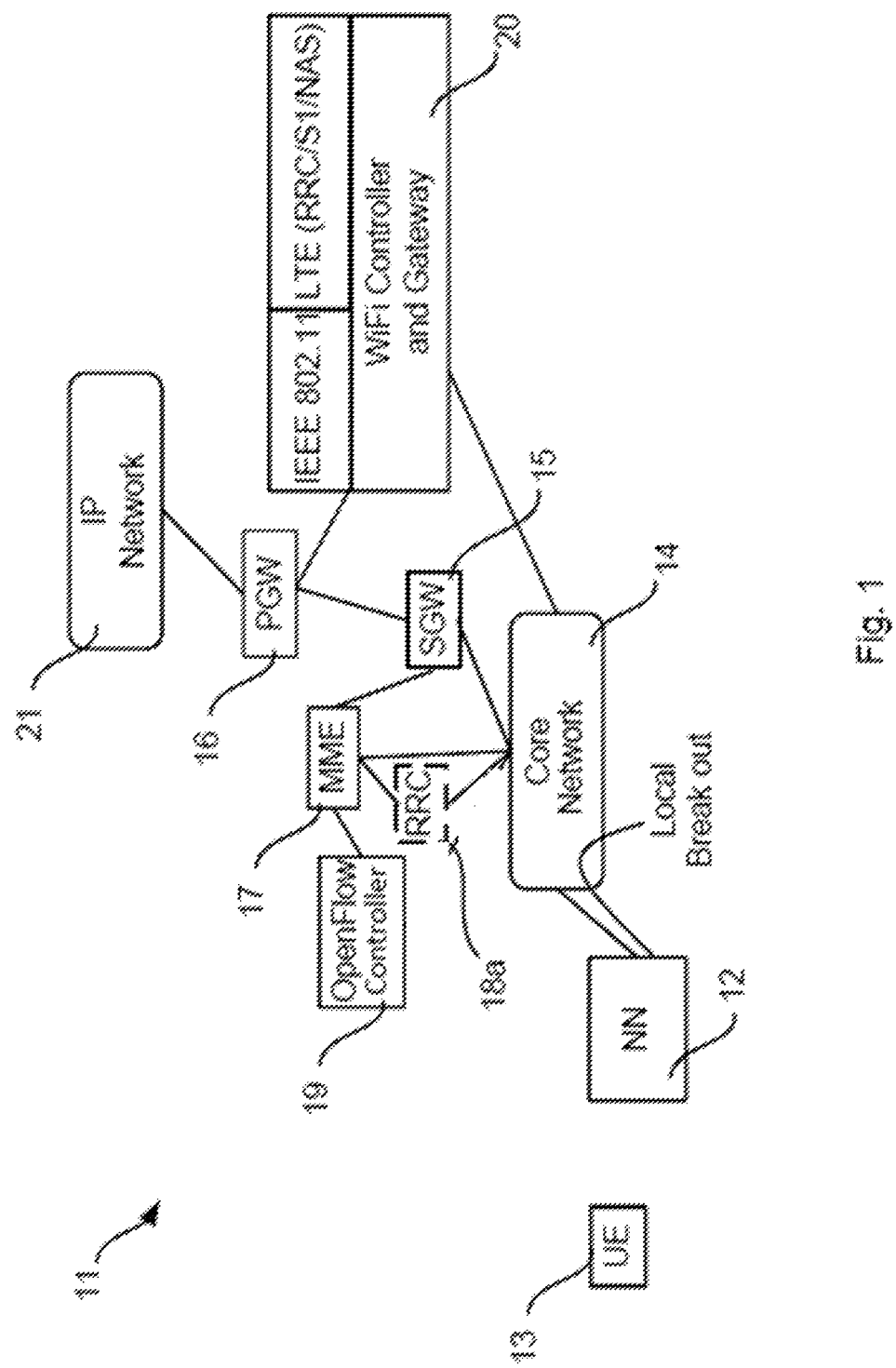
FIG. 1 is a schematic diagram illustrating a communications.

FIG. 1 is a schematic diagram illustrating a communications network 11 where embodiments presented herein can be applied. The communications network 11 is a so called LTE based system. It should be pointed out that the terms "LTE" and "LTE based" system is here used to comprise both present and future LTE based systems, such as, for example, advanced LTE systems. It should be appreciated that although FIG. 1 shows a communications network 11 in the form of a LTE based system, the example embodiments herein may also be utilized in connection with other communications networks comprising nodes and functions that correspond to the nodes and functions of the communications network 11 in FIG. 1.

The communications network 11 comprises a network node 12 representing a base station in the form of an eNodeB, operatively connected to a Serving Gateway (SGW) 15 via interfaces of a core network 14, in turn operatively connected to a Mobility Management Entity (MME) 17 and a Packet Data Network (PDN) Gateway (PGVV) 16, which in turn is operatively connected to packet switched IP service network 21. A radio terminal in the form of a user equipment 13 operatively connected to the network node 12 is thereby enabled to access services and data offered by the packet switched IP service network 21.

The eNodeB is thus the radio access node that interfaces with the radio terminal, which is denoted User Equipment (UE) 13 in LTE. The eNodeBs of the communications network 11 form the radio access network E-UTRAN for LTE. The SGW 15 routes and forwards user data packets, whilst also acting as the mobility anchor for the user plane during inter-eNB handovers and as the anchor for mobility between LTE and other 3GPP technologies (terminating the S4 interface and relaying the traffic between 2G/3G systems and the PGW 16). For idle state UEs, the SGW 15 terminates the downlink data path and triggers paging when downlink data arrives for the UE 13. It manages and stores UE contexts, e.g. parameters of the IP bearer service, network internal routing information. It also performs replication of the user traffic in case of lawful interception.

The MME 17 is responsible for idle mode UE tracking and paging procedure including retransmissions. It is involved in the bearer activation/deactivation process and is also responsible for choosing the SGW 16 for a UE 13 at the initial attach and at time of intra-LTE handover involving core network node relocation. It is responsible for authenticating the user (by interacting with a home subscriber server, HSS). Non-Access Stratum (NAS) signaling terminates at the MME 17 and is also responsible for generation and allocation of temporary identities to UEs 13. The MME 17 checks the authorization of the UE 13 to camp on the service provider's Public Land Mobile Network (PLMN) and enforces UE roaming restrictions. The MME 17 is the termination point in the network for ciphering/integrity protection for NAS signaling and handles the security key management. Lawful interception of signaling is also supported by the MME 17. The MME 17 also provides a control plane function for mobility between LTE and 2G/3G access networks with the S3 interface terminating at the MME 17 from a serving general packet radio service (GPRS) support node (SGSN) of the 2G/3G access networks. The MME 17 also terminates the S6a interface towards the HSS for roaming UEs The PGW 16 provides connectivity to the UE 13 to the external packet switched IP service network 21 by being the point of exit and entry of traffic for the UE 13. A UE 13 may have simultaneous connectivity with more than one PGW 16 for accessing multiple PDNs. The PGW 16 performs policy enforcement, packet filtering for each user, charging support, lawful Interception and packet screening. Another role of the PGW is to act as the anchor for mobility between 3GPP and non-3GPP technologies such as WiMAX and 3GPP2 (CDMA 1× and EvDO).

In general terms, a plurality of network nodes 12 are connected via a switched network. Depending on how much of the control functions that are centralized, the core network 14 may comprise a shared radio resource control (RRC) engine 18a that acts as common resource controller of all the network nodes 12, and that can act as control point for macro cell coordination.

Further, if small cell connectivity is controlled by a controller 19, the MME 17 can issue its transport related bearer control messages to the controller 19. The controller 19 can then set the switching connectivity accordingly.

The communications network 11 further comprises a WiFi controller and/or gateway 20. 3GPP entities may be emulated inside the WiFi controller and/or gateway 20. This may be accomplished by using a specific purpose protocol binding in support of LTE.

Figure 2:
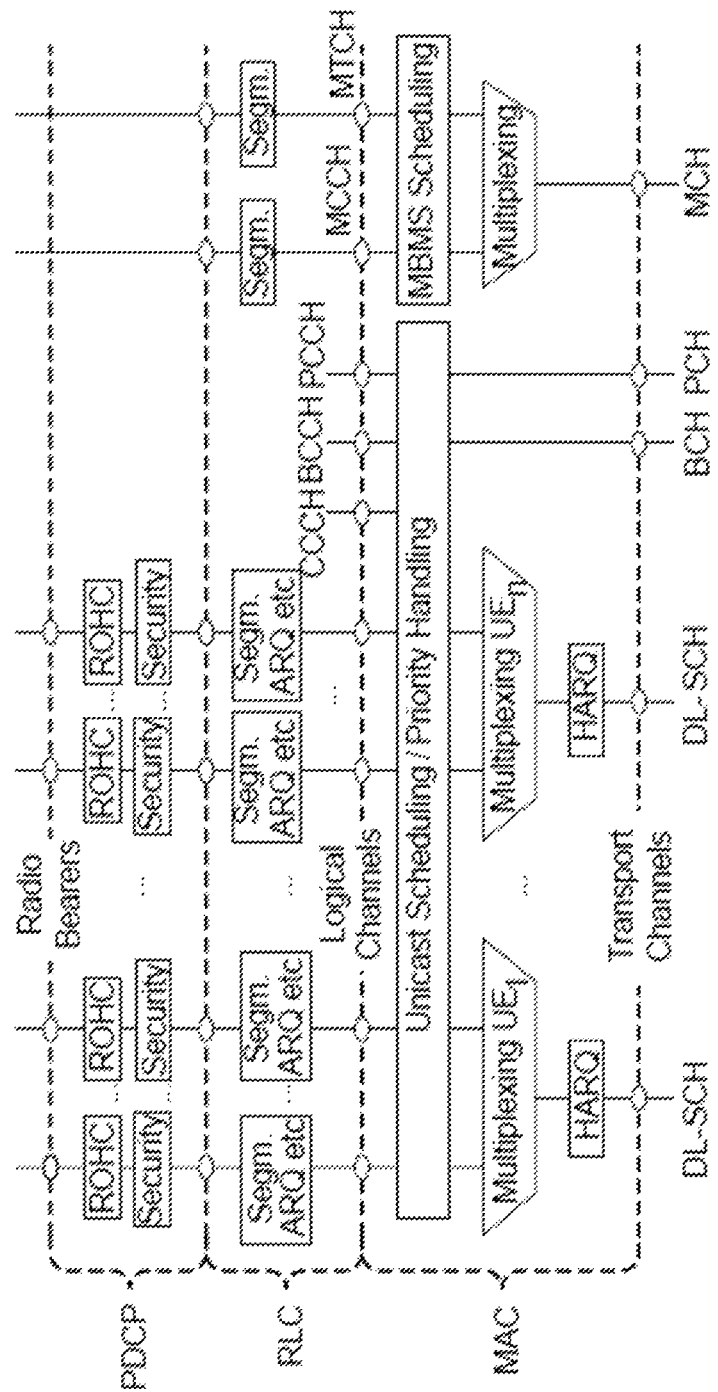
FIG. 2 is a schematic diagram illustrating a downlink Layer 2 structure.

FIG. 2 schematically illustrates, in accordance with LTE, parts of the network node side of the air interface towards the UE. The radio access is implemented by means of a number of protocols, most notably the Medium Access Control (MAC), Radio Link Control (RLC), and Packet Data Convergence Protocols (PDCP). The UE side uses the same protocols.

In general terms, the MAC protocol is for example used during the mapping of logical channels to transport channels, and during scheduling resources over the air interface. There are a number of such channels. For each UE 13 operatively connected to the network node 12, the network node 12 uses a separate instance of a Downlink Shared Channel (DL-SCH), over which it multiplexes different logical channels to and from the UE 13. The MAC protocol also uses special control channels;

The Broadcast Control Channel (BCCH) provides system information to all UEs 13 operatively connected to the network node 12; the Paging Control Channel (PCCH) is used for paging information when searching a UE 13 on a network; the Common Control Channel (CCCH) is used for random access information, e.g. for actions including setting up a connection. CCCH is used to signal to a UE 13 before a special signaling channel has been established to that UE 13. The MAC protocol keeps track of which logical channels it uses, by means of Logical Channel IDs (LCID) in its MAC PDU frames. In this way, the MAC protocol knows how to demultiplex the content it receives from the transport channel onto different logical channels.

Over each logical channel, LTE employs a Radio Link Control (RLC) protocol entity for error correction, concatenation and reassembly, duplicate detection etc. The PDCP entity, which in the protocol structure is positioned above the RLC entity, mainly provides robust header compression (ROHC) and security, such as ciphering/deciphering of user data. User data is normally in the form of IP packets to and from the UE 13. This packet is then mapped onto a transport tunnel, e.g., using GTP (GPRS Tunneling Protocol) back/from the core network 14.

As can be seen in FIG. 2, there is one PDCP entity per radio bearer. There are two kinds of radio bearers; Signaling Radio Bearers (SRB1 and SRB2) and Data Radio Bearers (DRB 1-8). A DRB, when concatenated with an S1 and an S5/S8 bearer in the transport domain, forms the EPS bearer. The EPS bearer may be regarded as the fundamental connection entity in a LTE based communications network and provides end-to-end services between a UE 13 and the packet switched IP service network 21. The bearer architecture is illustrated in FIG. 3.

As for SRB, there are two dedicated SRBs defined: SRB1 to carry RRC signaling to control the radio bearers, and SRB2 to control the transport parts of Non-Access Stratum. SRB2 can carry signaling between the UE 13 and the MME 17. SRB1 can also be used for MME signaling before SRB2 has been established.

Via its service interface to the PDCP entity, RLC provides the PDCP PDU. This PDU is ciphered and compressed.

Figure 3:
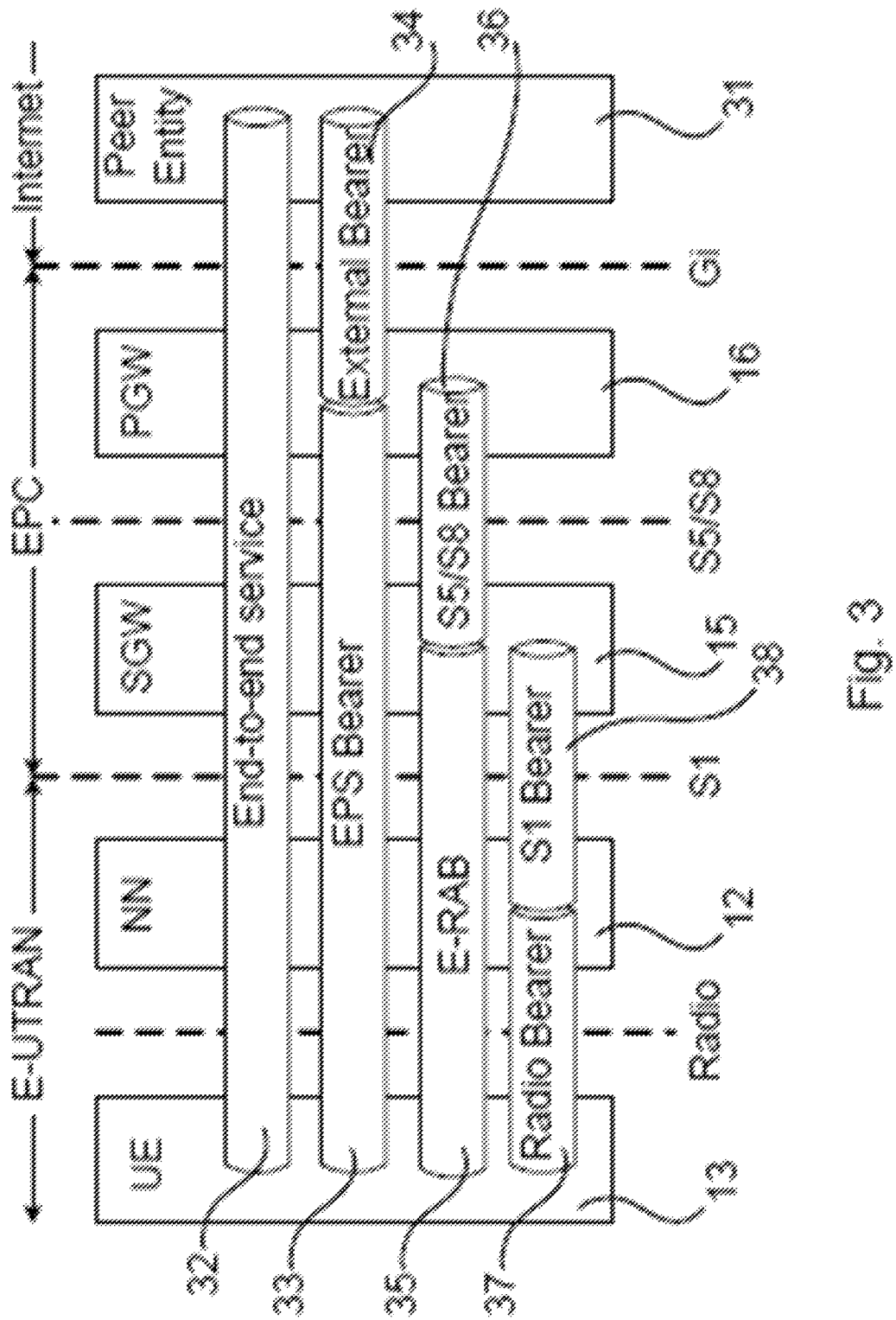
FIG. 3 is a schematic diagram illustrating the EPS bearer service architecture.

FIG. 3 schematically illustrates the bearer architecture in an LTE based communications network. An end-to-end service bearer 32 is established between a UE 13 and a peer entity 31. The peer entity 32 may be another UE. In turn, the end-to-end service bearer 32 comprises an EPS bearer 33 between the UE 13 and the PGW 16 and an external bearer 34 between the PGW 16 and the peer entity 31. In turn, the EPS bearer 33 comprises an Evolved Universal Terrestrial Radio Access Network (E-UTRAN) Radio Access Bearer (E-RAB bearer) 35 between the UE 13 and the SGW 15 and an S5/S8 bearer 36 between the SGW 15 and the PGW 16. In turn, the E-RAB bearer 35 comprises a radio bearer 37 between the UE 13 and the network node 12 and an S1 bearer 38 between the network node 12 and the SGW 15.

Example Architecture Implementation

An example architecture implementation related to flexible bearer handling in a communications network will now be discussed.

Figure 4B:
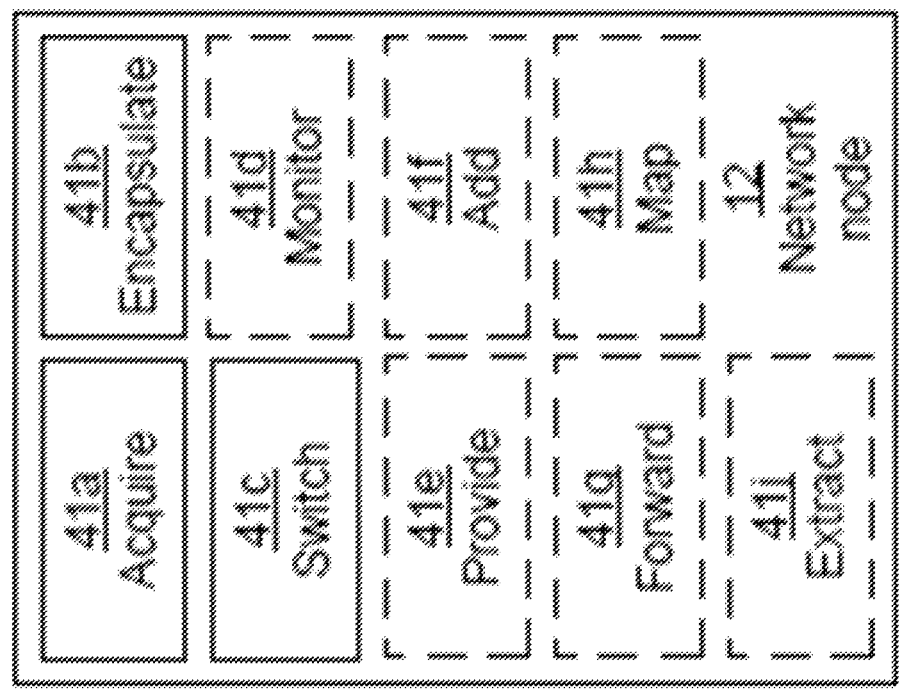
FIG. 4b is a schematic diagram showing functional units of a network node.
Figure 4A:
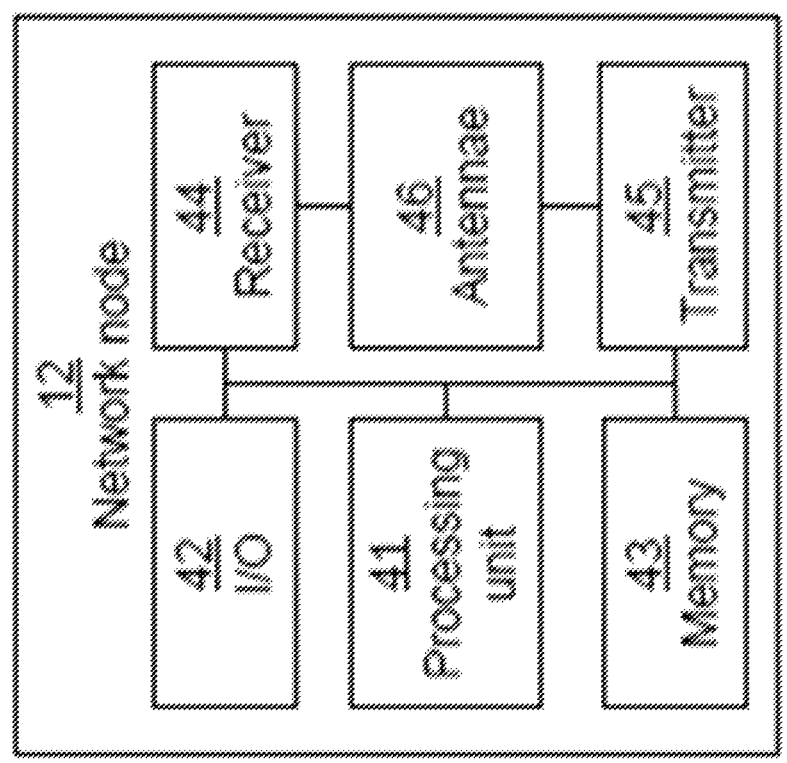
FIG. 4a is a schematic diagram showing functional modules of a network node.

FIG. 4a schematically illustrates, in terms of a number of functional modules, the components of a network node 12 according to an embodiment. A processing unit 41 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 51 (as in FIG. 5), e.g. in the form of a memory 43. Thus the processing unit 41 is thereby arranged to execute methods as herein disclosed. The memory 41 may also comprise persistent storage, which, for example, can be any single one or combination of magnetic memory, optical memory, solid state memory or even remotely mounted memory. The network node 12 may further comprise an input/output (I/O) interface 42 for receiving and providing information to a another network node. The network node 12 also comprises one or more transmitters 45 and receivers 44, comprising analogue and digital components and a suitable number of antennae 46 for radio communication with the UE 13. The processing unit 41 controls the general operation of the network node 12, e.g. by sending control signals to the transmitter 45 and/or receiver 44 and receiving reports from the transmitter and/or receiver 44 of its operation. Other components, as well as the related functionality, of the network node 12 are omitted in order not to obscure the concepts presented herein.

FIG. 4b schematically illustrates, in terms of a number of functional units, the components of a network node 12 according to an embodiment. The network node 12 of FIG. 4b comprises a number of functional units; an acquiring unit 41a, an encapsulating unit 41, and a switching unit 41c. The network node 12 of FIG. 4b may further comprises a number of optional functional units, such as any of a monitoring unit 41d, a providing unit 41e, an adding unit 41f, a forwarding unit, 41g, a mapping unit 41h, and an extracting unit 41j. The functionality of each functional unit 41a-j will be further disclosed below in the context of which the functional units may be used. In general terms, each functional unit 41a-j may be implemented in hardware or in software. The processing unit 41-j may thus be arranged to from the memory 43 fetch instructions as provided by a functional unit 41a-j and to execute these instructions, thereby performing any steps as will be disclosed hereinafter.

Figure 4C:
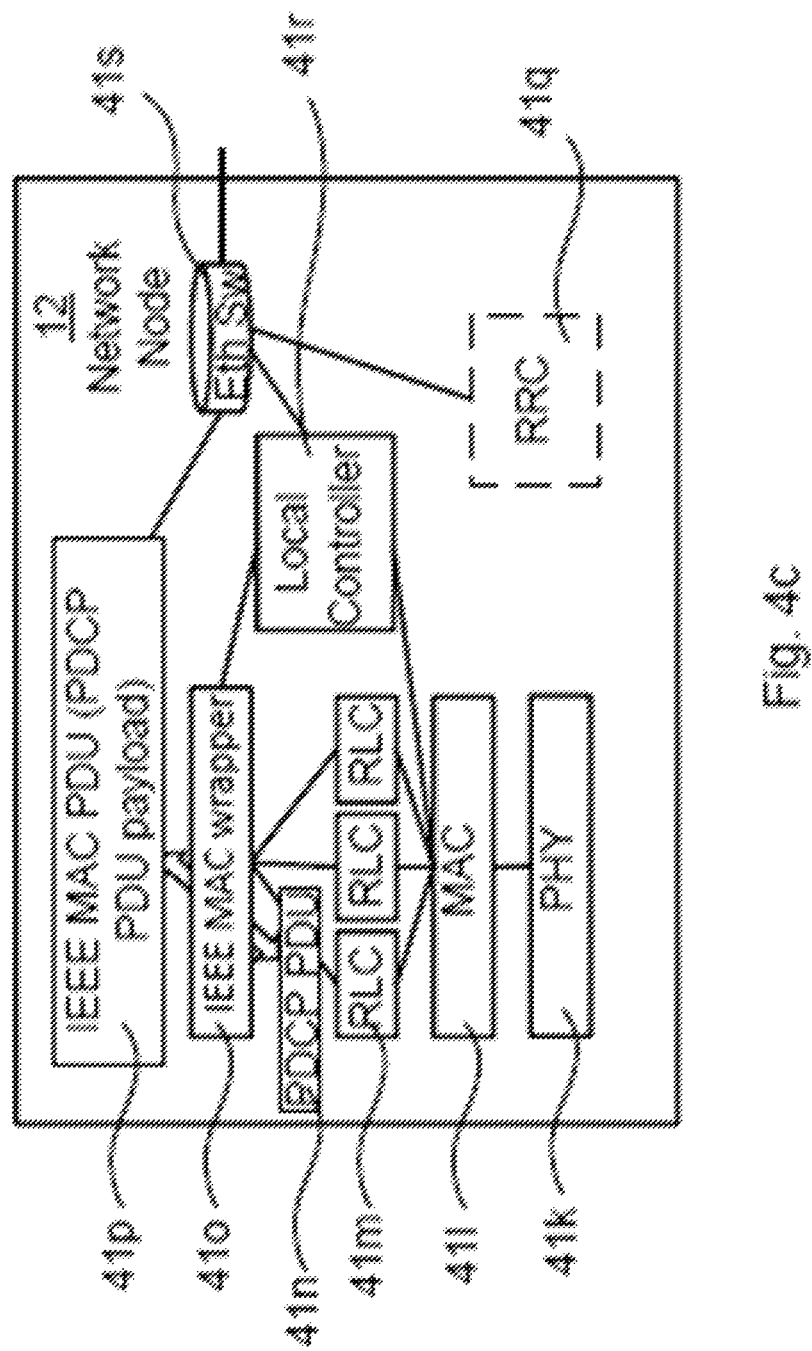
FIG. 4c is a schematic diagram showing logical units of a network.

FIG. 4c schematically illustrates in terms of a number of logical units, the components of a network node 12 according to an embodiment. The network node 12 comprises a physical layer (PHY) logical unit 41k, a medium access control layer (MAC) logical unit 41l, a plurality of radio link control (RLC) service interface logical units 41m, a IEEE MAC wrapper logical unit 41o for providing PDC PDUs 41n and IEEE MAC PDUs 41p (with PDCP PDU payload), an Ethernet switch logical unit 41s, a local controller logical unit 41r, and an optional radio resource control (RRC) logical unit 41q. For example, as will be further disclosed below, in case the RRC is to be located in the network node 12, the IEEE MAC PDUs can still be switched to the local RRC logical unit 41q. DRBs can still be forwarded towards the core network.

An Ethernet connection from the Ethernet switch logical unit 41s enables the local controller logical unit 41r to feed the system with system parameter values in case needed (as a consequence of moving e.g. the RRC out of the system).

Figure 6:
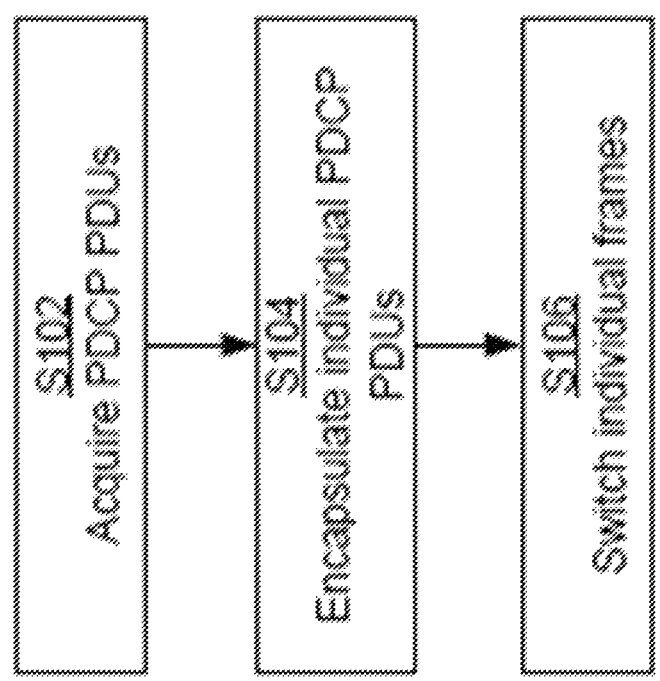
FIGS. 6 and 7 are flowcharts of methods.
Figure 5:
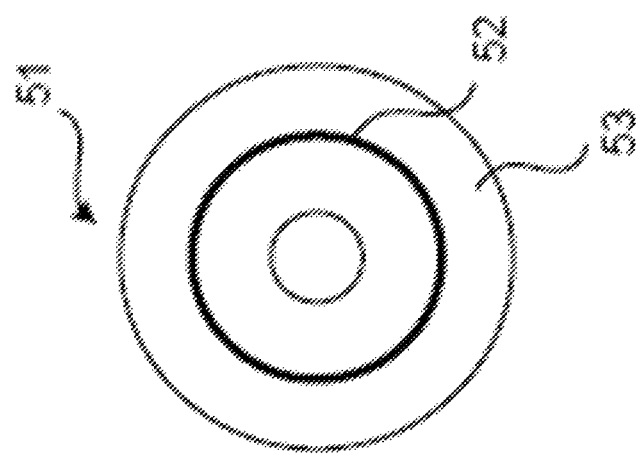
FIG. 5 shows one example of a computer program product comprising computer readable means.
Figure 7:
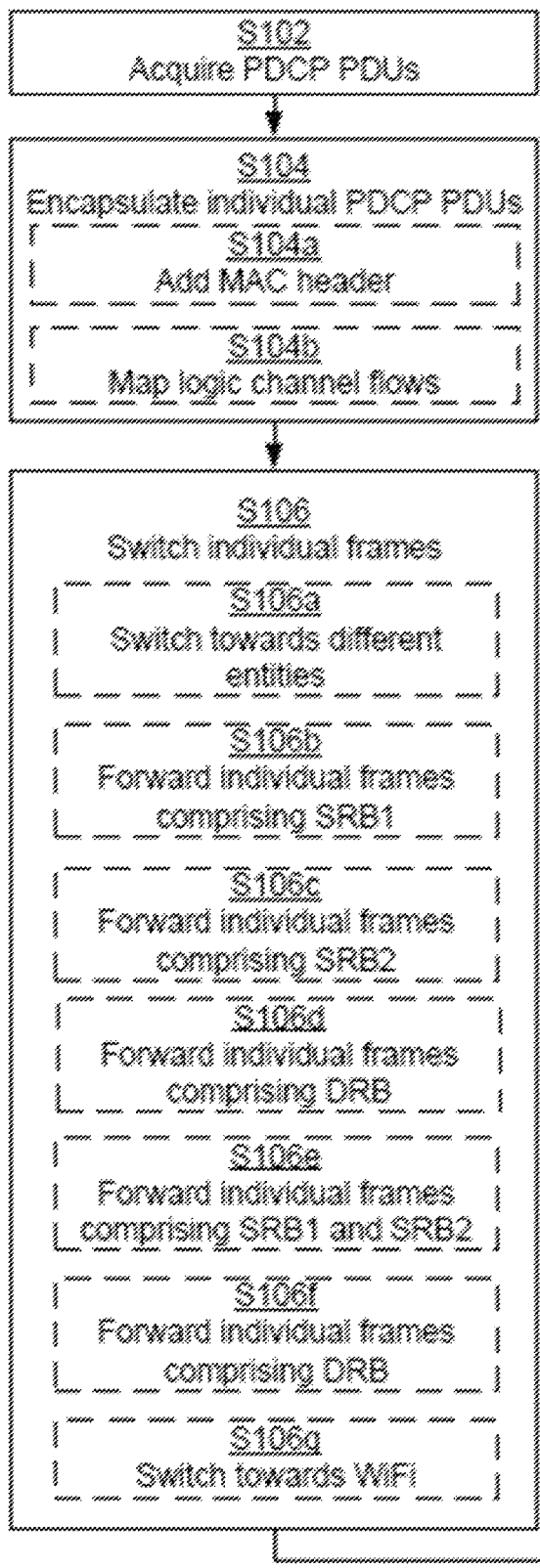
Figure 7:
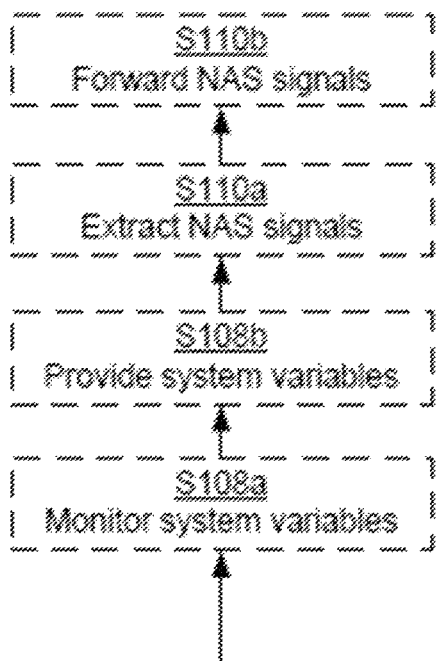

FIG. 6 and FIG. 7 are flow chart illustrating flexible bearer handling in a communications network. The methods are performed by the network node 12. The methods are advantageously provided as computer programs 52. FIG. 5 shows one example of a computer program product 51 comprising computer readable means 53. On this computer readable means 53 a computer program 52 can be stored, which computer program 52 can cause the processing unit 41 and thereto operatively coupled entities and devices, such as the memory 43, the I/O interface 42, the transmitter 45, the receiver 44 and/or the antennae 46 to execute methods according to embodiments described herein. The computer program 52 and/or computer program product 51 may thus provide means for performing any steps as herein disclosed.

In the example of FIG. 5, the computer program product 51 is illustrated as an optical disc, such as a CD (compact disc) or a DVD (digital versatile disc) or a Blu-Ray disc. The computer program product 51 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 52 is here schematically shown as a track on the depicted optical disk, the computer program 52 can be stored in any way which is suitable for the computer program product 51.

Reference is now made to the flow chart of FIG. 6 illustrating an embodiment of a method for flexible bearer handling in a communications network 11 as performed by a network node 12.

The processing unit 41 of the network node 12 is arranged to, in a step S102, acquire packet data convergence protocol (PDCP) protocol data units (PDUs). The acquiring may be performed by executing functionality of the acquiring unit 41a. The computer program 52 and/or computer program product 51 may thus provide means for this acquiring. The PDCP PDUs may originate from a UE 13 and thus first be received through the antenna 46 and then the receiver 44 of the network node 12 before being acquired by the processing unit 41. Example of data carried by the PDUs will be provided below.

The PDCP PDUs are then treated individually by the network node 12, particularly each PDCP PDU is by the network node 12 encapsulated in individual frames above a bottom-most protocol layer. Thus, the processing unit 41 of the network node 12 is arranged to, in a step S104, encapsulate individual PDCP PDUs into individual frames above the bottom-most protocol layer. The encapsulating may be performed by executing functionality of the encapsulating unit 41b. The computer program 52 and/or computer program product 51 may thus provide means for this encapsulating.

The thus individually encapsulated PDCP PDUs are then transmitted towards a packet switched network, such as the core network 14, and optionally further towards the IP network 21. The processing unit 41 of the network node 12 is arranged to, in a step S106, switch the individual frames towards a packet switched network. The switching may be performed by executing functionality of the switching unit 41c. The computer program 52 and/or computer program product 51 may thus provide means for this switching. The individual frames may thereby be individually switched. The individual frames are by the processing unit 41 provided to the I/O interface 42 or the transmitter 45 for transmission from the network node 12.

The bottom-most protocol layer may be a physical layer. The individual frames may be L2, L3, or L4 layer frames.

This inter alia enables PDCP PDUs to be encapsulated into IEEE 802.3 frames or similar, according to an algorithmic method that can operate in a stateless fashion. This introduce more flexibility in handling inter alia LTE radio bearers by means of a local Ethernet switch or similar in the network node 12. As will be further disclosed below, the resulting packetized PDUs may be used to implement flexible switching of various PDCP PDUs, inter alia enabling individually switching of PDUs that are carrying SRB1, SRB2, and DRBs.

Embodiments relating to further details of flexible bearer handling in a communications network 11 as performed by a network node 12 will now be disclosed. Reference is made to the flow chart of FIG. 7 illustrating further embodiments of methods for flexible bearer handling in a communications network 11 as performed by a network node 12.

There may be different ways to encapsulate individual PDCP PDUs into individual frames, as in step S104 above. Different embodiments relating thereto will now be described in turn.

There may be different types of frames above the bottom-most protocol layer that the individual PDCP PDUs are encapsulated into. According to an embodiment the individual frames are either IEEE Ethernet frames, IEEE 802.3 frames, Internet Protocol (IP), frames, multiprotocol label switching (MPLS), frames, metro Ethernet forum specification 22 (MEF 22) frames, layer 2 virtual private network (L2VPN) frames, High-Level Data Link Control (HDLC) frames, Optical Transport Network (OTN) frames, Synchronous Digital Hierarchy (SDH) frames, Plesiochronous digital hierarchy (PDH) frames, Digital Subscriber Line (DSL) frames, Transmission Control Protocol (TCP) frames, User Datagram Protocol (UDP) frames, or Hypertext Transfer Protocol (HTTP) frames.

The encapsulating may involve adding headers to the PDCP PDUs. These headers may, for example, be either MAC headers or MPLS headers. According to an embodiment the processing unit 41 of the network node 12 is thus arranged to, in an optional step S104a, add an individual MAC header or an individual MPLS header to each PDCP PDU. The adding may be performed by executing functionality of the adding unit 41f. The computer program 52 and/or computer program product 51 may thus provide means for this adding.

Each individual frame may comprise either a first signal radio bearer (SRB1), a second signal radio bearer (SRB2), or a data radio bearer (DRB). Alternatively, each individual frame may comprise a combination of different such bearers, where the different bearers are differentiated by the use of protocol discriminators within the frame.

For example, the network node 12 may derive a locally administered (private) 48 bit IEEE MAC address based on e.g. a scheme as follows: 8 bits specific to the network node ID+4 bits based on MAC LCID thus also identifying if the PDCP PDU belongs to SRB1 or SRB2 or DRB1-8+8 bits unique for each UE/logical channel on the network node 12.

The network node 12 may thus add the resulting IEEE 802.3 MAC header to the PDCP PDU, and forward the resulting IEEE Ethernet frame to a local switch. According to an embodiment the processing unit 41 of the network node 12 is arranged to, in an optional step S104b, map logic channel flows to network addresses, such as MAC addresses. The mapping may be performed by executing functionality of the mapping unit 41h. The computer program 52 and/or computer program product 51 may thus provide means for this mapping. For each PDCP PDU, the network node 12 may thus keep track of which UE 13 and logical channel it serves. This is visible from the MAC PDU level.

There may be different ways to individually switch the individual frames. Different embodiments relating thereto will now be described in turn.

For example, the processing unit 41 may act as a local Ethernet switch. In this role the processing unit 41 may switch Ethernet frames (comprising the PDCP PDUs) according to several schemes, e.g. inspired by OpenFlow schemes. For example, the processing unit 41 of the network node 12 may act as a local controller. In this role the processing unit 41 may be responsible for providing system variables. Thus, according to an embodiment the processing unit 41 of the network node 12 is arranged to, in an optional step S108a, explicitly provide system variables used by local protocol layers in the network node. The providing may be performed by executing functionality of the providing unit 41e. The computer program 52 and/or computer program product 51 may thus provide means for this providing. The processing unit 41 of the network node 12 may be arranged to, in an optional step S108b, explicitly extract the system variables to be used by protocol layers exported to network node external entities. The extracting may be performed by executing functionality of the extracting unit 41j. The computer program 52 and/or computer program product 51 may thus provide means for this extracting.

For example, during the step of individually switching the individual frames (step S106) the network node 12 may identify the type of PDCP PDU carried and forward all SRB1 packets to a centrally located entity implementing a remote radio unit (RRC) finite state machine (FSM). Similarly, it can forward SRB2 packets to a centrally located node implementing S1-AP and NAS functions. In case the RRC shall remain as a local entity on the network node 12 (see below), the PDCP flow of the SRB1 needs not be processed as described above but can be terminated locally.

According to an embodiment the step S106 of individually switching involves the processing unit 41 of the network node 12 to be arranged to, in an optional step S106a, switch individual frames towards different network entities, such as towards different physical or logical network nodes. The switching may be performed by executing functionality of the switching unit 41c. The computer program 52 and/or computer program product 51 may thus provide means for this switching. A centrally located controller 19 may thereby decide to drop any DRB carrying user data locally on the network node 12 or anywhere in the network. Since the controller 19 may have a full picture of ingress and egress points for LTE bearers, it can enforce consistency for the down- and uplink traffic flows of a particular bearer connection.

There may be different ways to implement the functionality of the RRC. Different embodiments relating thereto will now be described in turn.

For example, the RRC may be part of the network. Thus according to an embodiment the step S106 of individually switching involves the processing unit 41 of the network node 12 to be arranged to, in an optional step S106b, forward individual frames comprising the SRB1 to an RRC entity in the network; and in an optional step S106c, forward individual frames comprising the SRB2 to an S1-AP and NAS entity in the network. The DRB may be forwarded to the SGW 15. Thus according to an embodiment the step S106 of individually switching involves the processing unit 41 of the network node 12 to be arranged to, in an optional step S106d, forward the individual frames comprising DRB packets to a serving gateway (SGW) acting entity 15 in the network 11. The forwarding may be performed by executing functionality of the forwarding unit 41g. The computer program 52 and/or computer program product 51 may thus provide means for this forwarding. The same channel could be used to enable regular S1-AP signaling between the network node 12 and the MME 17.

For example, the RRC may be part of the network node 12. Thereby IEEE MAC PDUs may be switched to the local entity implementing RRC, and DRBs may be forwarded towards the core network 14. Thus according to an embodiment the step S106 of individually switching involves the processing unit 41 of the network node 12 to be arranged to, in an optional step S106e, forward individual frames comprising the SRB1 and individual frames comprising the SRB2 to an RRC entity in the network node 12; and, in an optional step S106f, forward individual frames comprising DRBs to the network. The forwarding may be performed by executing functionality of the forwarding unit 41g. The computer program 52 and/or computer program product 51 may thus provide means for this forwarding.

There may be different ways to handle simultaneously use of WiFi. For example, in case a best effort DRB is setup from a UE 13 that also simultaneously has an active WiFi connection, the network node 12 may determine to switch Ethernet frame encapsulating its PDCP PDU to the same location as where the WiFi frame is processed. A UE 13, associated with the PDCP PDUs, may thus have a simultaneous active WiFi connection. According to an embodiment the step S106 of individually switching therefore involves the processing unit 41 of the network node 12 to be arranged to, in an optional step S106g, switch the individual frames towards a WiFi controller and/or gateway 20 where WiFi frames of the active WiFi connection are processed. The switching may be performed by executing functionality of the switching unit 41c. The computer program 52 and/or computer program product 51 may thus provide means for this switching.

There may be different ways to handle so-called local break out scenarios. For example, radio bearers may be looped locally. Assume, for example, that two UEs are operatively connected to the same network node 12. Instead of switching traffic between two UEs through the core network 14, the network node 12 may decide to directly forward traffic from one of the two UEs to the other of the two UEs, without first switching the traffic towards the core network 14. According to an embodiment the processing unit 41 of the network node 12 is arranged to, in an optional step S106g, switch DRB flows directly between two entities operatively connected to the network node 12. The switching may be performed by executing functionality of the switching unit 41c. The computer program 52 and/or computer program product 51 may thus provide means for this switching. The local break out facilities enable effective packet switching of user traffic. This includes the possibility of looping radio bearers locally, whilst still keeping control of radio resources via a centrally located RRC 18a.

There may be different ways to handle NAS signaling. In order to enable NAS message exchanges over SRB1 and SRB0 (before a dedicated signaling channel has been established), NAS signals may be extracted and forwarded on an S1-AP interface or similar. This may be achieved via a special management channel that can be identified via a reserved local IEEE MAC address. This will also enable special commands to be implemented in case parameters need to be explicitly set. According to an embodiment the processing unit 41 of the network node 12 is therefore arranged to, in an optional step S110a, extract NAS signals from the PDCP PDUs; and, in an optional step S110b, forward the extracted NAS signals to an S1-AP signaling service. The extracting may be performed by executing functionality of the extracting unit 41j. The computer program 52 and/or computer program product 51 may thus provide means for this extracting.

There may be different ways to handle security aspects of the PDCP PDUs. Different embodiments relating thereto will now be described in turn.

For example, the ciphered and integrity protected SRB/DRB PDCP PDUs may not be manipulated in the network node 12. For example, the SRB/DRB PDCP PDUs may not be deciphered. According to an embodiment the PDCP PDUs remain ciphered during the steps of encapsulating (step S104) and switching (step S106).

In summary, in this sub-section, there have been disclosed mechanisms for for flexible bearer handling in a communications network. These mechanism may, according to some of the presented embodiments, involve encapsulating PDCP PDUs into IEEE 802.3 frames or similar, according to an algorithmic method that can operate in a stateless fashion, so as to introduce more flexibility in handling LTE radio bearers by means of a local Ethernet switch or similar. The resulting packetized PDUs may be used to implement flexible switching of various PDCP PDUs, e.g. individually switching PDUs that are carrying SRB1, SRB2, and DRBs. The disclosed mechanisms for for flexible bearer handling in a communications network may be used to implement a split architecture of signaling and data radio bearers, so that each can terminate on entities located in different physical or logical nodes. The disclosed mechanisms for for flexible bearer handling in a communications network may be used to combine an OpenFlow type of packet switched network with MME transport control and RRC radio bearer control to achieve tight coordination between radio and transport for small cells.

Connected Vehicle Implementation

The implementation described above may be applied to a secure and connected vehicle small cell. It should be appreciated that while the above section discusses providing unencrypted communications, such a method would normally not be attempted in a wireless scenario, as is the scenario in a vehicle small cell. In a wireless scenario, there is a greater risk of eavesdropping. However, the inventors have discovered using the architecture previously described may be beneficial to a wireless vehicle small cell scenario. In particular, since such a vehicle is in motion, procedures such as a handover will not greatly affect communications as will be explained.

The automotive industry is continuously improving its vehicles in terms of energy efficiency, isolation against external heat/cold etc. One side effect from this is that radio propagation inside the vehicles is becoming a serious challenge that mandates new solutions. Here, some vehicle manufacturers will probably come to the conclusion that "outside-in" radio propagation (e.g. penetration of LTE radio signals from a roadside macro station into the NG vehicles) is not a future proof option. One approach to solve the in-vehicle radio coverage issue is to deploy low-power small cells inside the vehicle.

In order to solve the issues of in-vehicle 3GPP radio coverage, the deployment of femtocells may be utilized. However, deploying in-vehicle femtocells creates a number of challenges and major issues.

For example, there is no inherent support for multi-operator radio access. This means that a femtocell inside the vehicle will typically only support one mobile operator, and that users inside the vehicle who do are not subscribers to that operator have no access to the in-vehicle network, except for emergency calls (as stipulated by 3GPP standards and regulations). One could envisage multioperator support, but since a femtocell is a full eNodeB (radio base station) is implies that the connection of this eNodeB to the different operators' networks have to abide by one security policy per operator. This is inherently costly and not a viable alternative. Another option is to implement some kind of regional (in-vehicle!) roaming agreement in-between the operator controlling the in-vehicle femtocell and other operators, but this is also a cumbersome way to solve the multi-operator issue.

A further example is that a femtocell comprises both radio access network (RAN) and core network (CN) protocols. The transition of cellular user and control data in-between RAN and CN introduces a point inside the eNodeB where this data is available in cleartext (from a 3GPP perspective— it can still be encrypted at the application layer in the cellular phones/mobile terminals) and not integrity protected. At this point, e.g. voice packets can be taped in cleartext. Since the femto resides in a vehicle, we can and indeed should expect that attempts will be made by car specialists and others, to tap such data.

Thus, at least one example object of the example embodiments presented herein is to provide an efficient backhauling of a split femtocell (or flexible bearer handling) architecture inside a vehicle.

Accordingly, some of the example embodiments are directed towards a method and node related to a Connected Vehicle Small Cell (CVSC) Gateway (GVV). The CVSC GW may be situated on top of a PDN Gateway and terminates/originates the PDCP PDUs from/to the vehicles. According to some of the example embodiments, a special APN is used to connect the CVSC to the appropriate PDN gateway leading to the CVSC GW. To the core network (Evolved Packet Core, EPC), the CVSC GW can support a number of femto gateway models, e.g. for control plane traffic or user plane traffic or both. When applicable, the CVSC GW can use local-break out on the macro cell site, of PDCP PDUs, for the sake of dual connectivity of in-vehicle cellular devices.

Some of the example embodiments are directed towards multi-operator support at the radio bearer levels of devices connected to the in-vehicle Connected Vehicle Small Cell (which as stated earlier is a "split femtocell").

Some of the example embodiments are directed towards operational methods by which the LTE backhaul link is supported by optionally reusing the existing LTE EPC.

Figure 8:
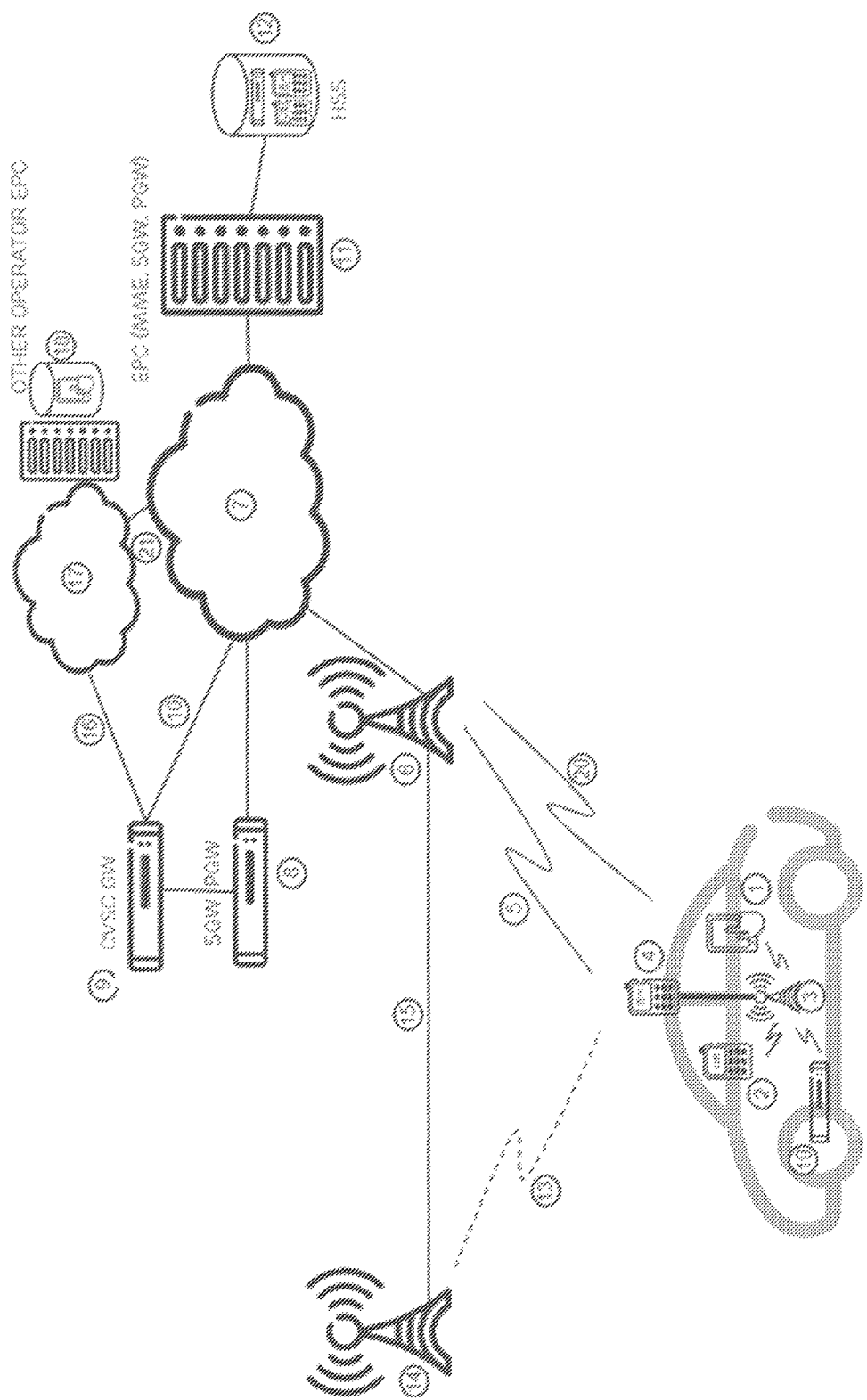
FIG. 8 is an illustrative example of a vehicle small cell implementation, according to some of the example embodiments presented herein.

FIG. 8 illustrates an example implementation of a secure connected vehicle small cell, according to some of the example embodiments.

Devices of various kinds (1, 2, 19) inside the vehicle connect to an in-vehicle stripped-down base station (3). This base station (3) is henceforth referred to as Connected Vehicle Small Cell (CVSC).

The CVSC (3) is using a packet interface to backhaul the PDCP PDUs (Packet Data Convergence Protocol). The backhaul link between the CVSC and the network is implemented by a tethering-like device (4), which typically uses LTE bearers (5) to connect to a macro/roadside base station (6).

The backhaul UE (4) (User Entity, 3GPP name for cellular or other devices) is typically integrated with some antenna solution to achieve good wireless backhauling. This UE (4), although having a special role of relaying traffic between the network and other "real" UEs (1, 2, and 19), can still be treated by the network as a regular UE.

The BH UE (4) is configured with a special APN (Access Point Name) or similar, e.g. as registered in HSS (Home Subscriber Service), that tells the network that it shall be anchored in Serving Gateway "SGW/PGW" (8). This means that all traffic from this UE (4) terminates in SGW/PGW (8). It should be appreciated that other means of identification, other than a special APN may be employed. For example a flag or cause code.

The BH link (5) is treated as any other BH link, e.g. for seamless mobility management from one macro base station (5, 6) to another (13, 14). PDCP PDUs carried over the backhaul links (5,13) during handover will still be anchored in SGW/PGW (8) and will normally arrive in order and with minimum packet loss as stipulated by 3GPP.

The CVSC Gateway (9) terminates/originates all relevant (i.e. originating from the split stack inside the vehicles) bearers from/to SGW/PGW (8). The CVSC GW (9) can use a packet header construct of some sort (e.g. IPv6 header fields) to discriminate between PDCP flows from different devices (1, 2, 19) and vehicles.

Vehicles could be pre-assigned with their own IPv6 addresses, or this could be provisioning e.g. via DHCP or similar.

The CVSC GW supports all prior solutions in relation to local break out when using the split stack, including at the radio bearer level.

The CVSC GW could be co-located with an existing macro, and could also be using the same resources as an existing macro (e.g. PDCP entities etc).

The CVSC GW provides a number of options in its interactions with the core networks. In one option, the CVSC GW provides the means to implement a shared LTE network scheme for the base stations located inside the vehicles. Here, if the in-vehicle frequency belongs to one of the operators (in the realm of 7, 11, 12), the other operator would get access to this shared network via its interface (16) to the CVSC GW (9).

In case of support of dual connectivity of an in-vehicle device, so that this device is connected to both a macro cell (e.g. for control plane traffic) and its CVSC, then the solution shall support dual-connectivity type of solutions, e.g. as in 3GPP master/slave base station scenarios.

The system solution can operate in the realm of both "mobile femto" as well as 3GPP style mobile relay.

It should be appreciated that the CVSC GW may comprise similar components and functionality as described in relation to the network node of FIGS. 4a, 4b and 4c.

According to some of the example embodiments, a vehicle device, for example device 1, may attempt to connect to the network. The macro base station 6 may not be able to serve the device in the vehicle. Thus, device 1 will connect to base station 3 which may be a standard LTE low power node which may be used to connect any number of applications or devices in the vehicle using LTE.

Frames coming into base station 3 are typically not encrypted. Thus, base station 3 encapsulates the frames in, for example, IvP6. tethering device 4 is used to establish a connection to the SGW/PGW 8 via the chain 4→5→6→7→8. the SGW/PGW may un-encapsulate the frame and thereafter send the frame to the CVSC GW 9.

In the case of mobility, for example, a change in serving base station from 6 to 14, the handover procedure may be handled by LTE as is known. Such a procedure will not be visible from the point of view of base station 3 and gateway 9.

Example Node Configurations

Figure 9:
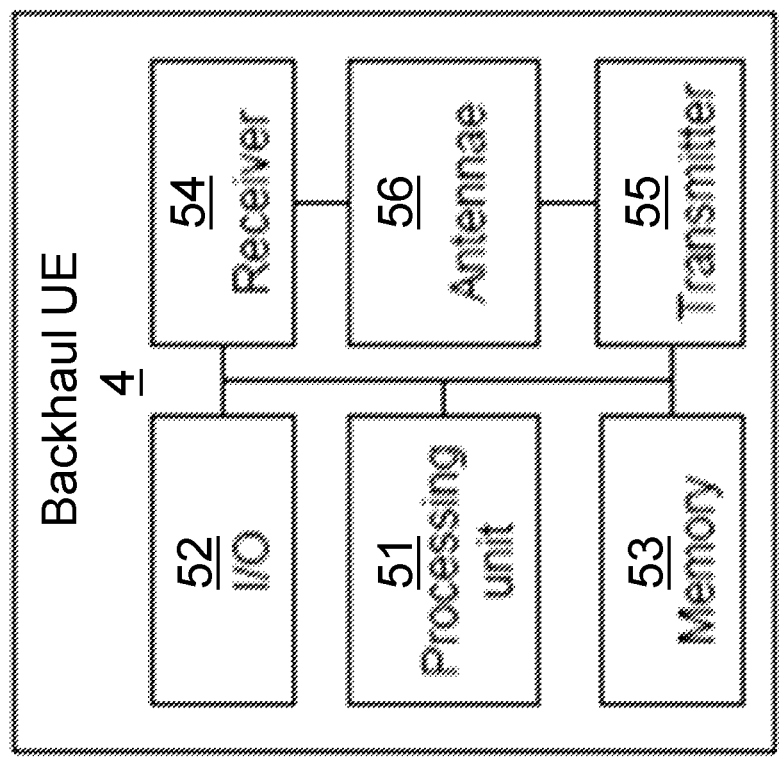
FIG. 9 is a schematic diagram illustrating a backhaul UE, according to some of the example embodiments presented herein.

Under this subheading, an example node configuration of a CVSC GW and backhaul UE will be provided, according to some of the example embodiments discussed herein. It should be appreciated that the CVSC GW 9 may comprise the same components as discussed in relation to the network node 12, discussed in relation to FIG. 4a. Thus, in the remaining sections herein, the various components of the CVSC GW 9 will be discussed using the components descried in FIG. 4a. It should further be appreciated that the backhaul UE 4 may also comprise components such as those discussed in relation to FIG. 4a. Such components are illustrated in FIG. 9.

Example Node Operations

Figure 10A:
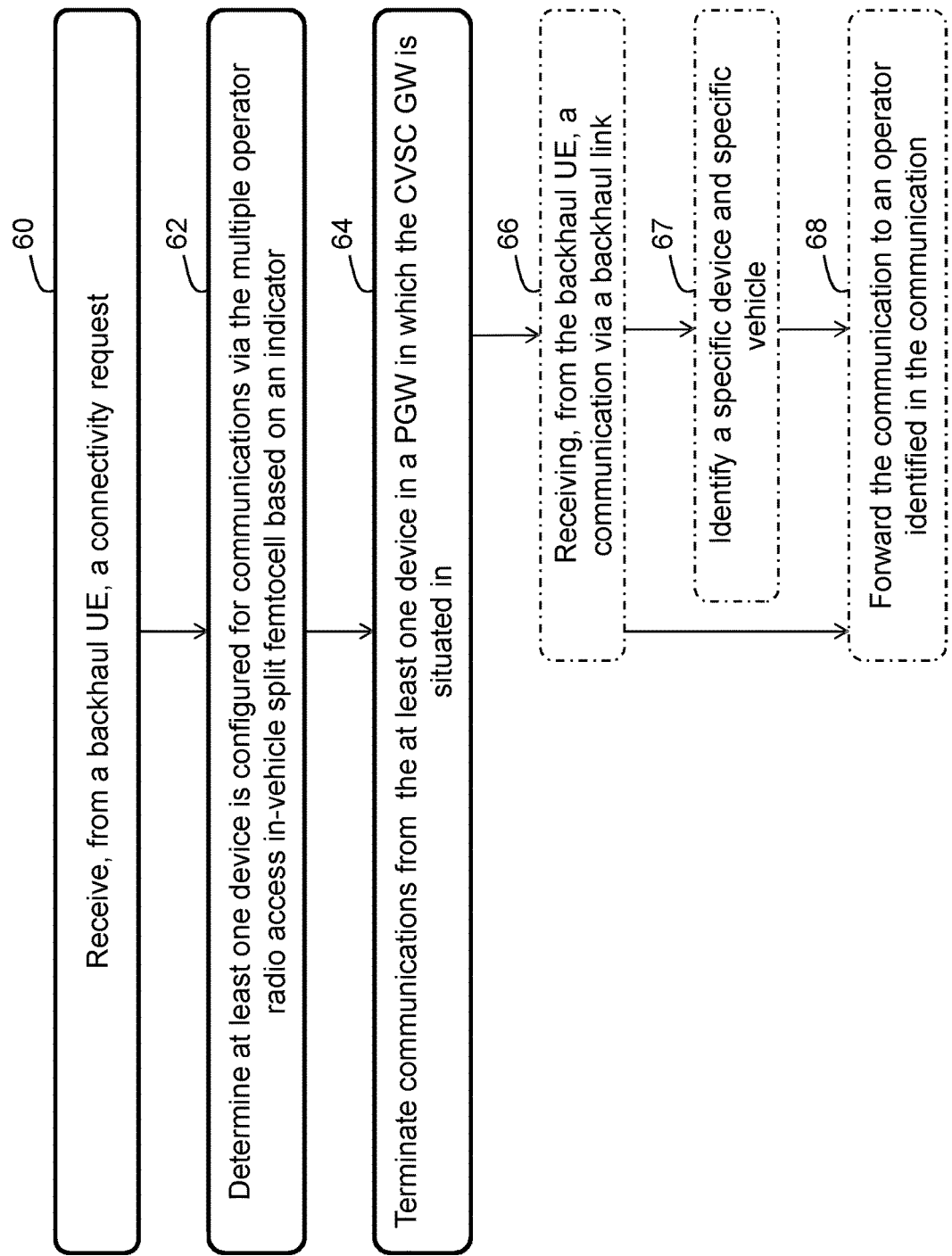
FIG. 10A is a flow diagram depicting example operations performed by the CVSC GW, according to some of the example embodiments.

FIG. 10A is a flow diagram depicting example operations which may be taken by the CVSC GW 9 for providing a multiple operator radio access in-vehicle split femtocell in a wireless communications network as described herein. It should also be appreciated that FIG. 10A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

Figure 10B:
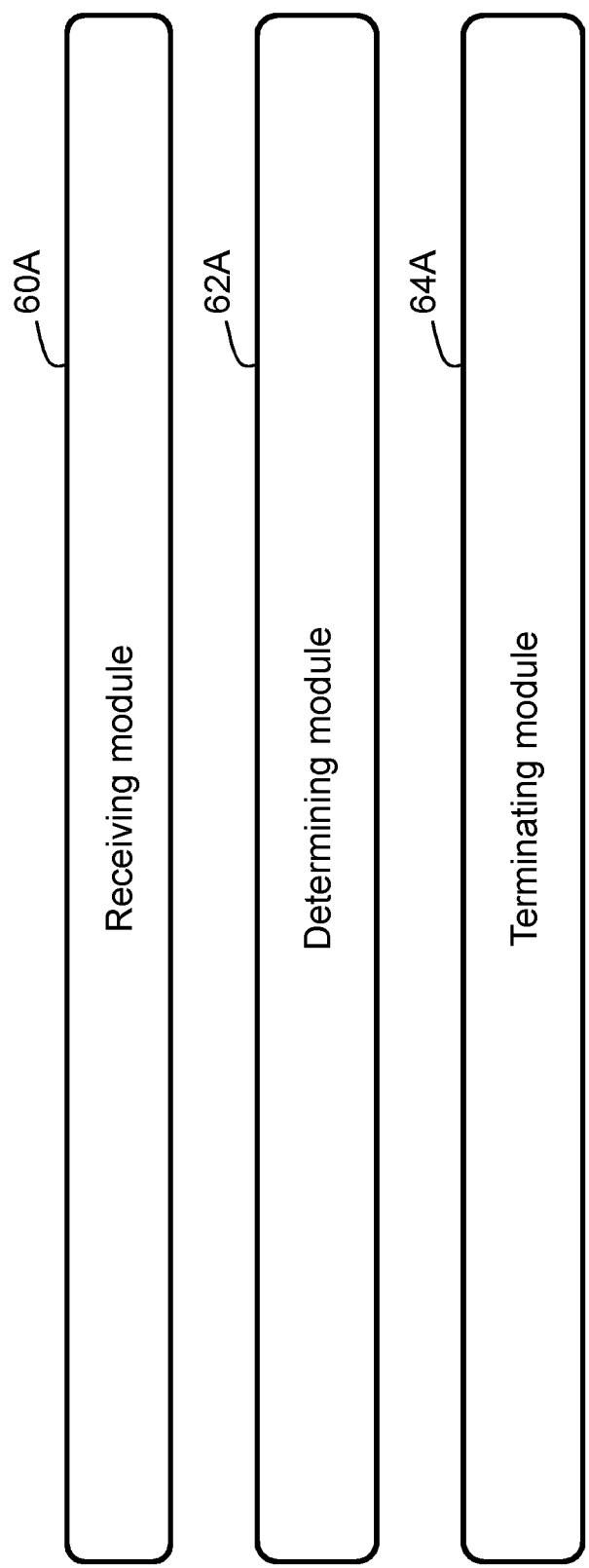
FIG. 10B is a module diagram of the CVSC GW, according to some of the example embodiments.

FIG. 10B is a module diagram depicting modules which may perform at least some of the operations of FIG. 10A.

Operation 60

The CVSC GW 9 is configured to receive 60, from a backhaul user equipment 4, a connectivity request for at least one device 1, 2, 19 inside a vehicle and being served by a CVSC 3. The connectivity request comprises an indicator. The receiver 44 is configured to receive the connectivity request. The receiving module 60A is configured to perform the receiving.

According to some of the example embodiments, the indicator is used to put the CVSC GW 9 on notice that the device, from which the connectivity request is originating from, is configured for communications via the multiple operator radio access in-vehicle split femtocell. According to some of the example embodiments, the indicator may be in the form of a APN, a cause code or a flag.

Operation 62

The CVSC GW 9 is further configured to determine 62 the at least one device is configured for communications via the multiple operator radio access in-vehicle split femtocell based on the indicator. The processing unit 41 is configured to determine the at least one device is configured for communications via the multiple operator radio access in-vehicle split femtocell based on the indicator. The determining module 62A is configured to perform operation 62.

As described above in relation to operation 60, the indicator is used to put the CVSC GW 9 on notice that the device is configured for such communications.

Operation 64

The CVSC GW 9 is further configured to terminate 64 communications from the at least one device in a PGW 8 in which the CVSC GW is situated. The processing unit 41 is configured to terminate communications from the at least one device in the PGW 8 in which the CVSC GW is situated. The terminating module 64A is configured to perform operation 64. Operation 64 is further explained at least in relation to FIG. 8.

Example Operation 66

According to some of the example embodiments, the CVSC GW 9 may be further configured to receive 66, from the backhaul UE 4, a communication originating from the at least one device 1, 2, 19. The communication comprises PDCP PDUs. The receiving 66 is performed via a backhaul link 5. The receiver 44 is configured to receive, from the backhaul UE, the communication originating from the at least one device.

Example Operation 67

According to some of the example embodiments, the CVSC GW 9 may thereafter be configured to identify 67 a specific device of the at least one device in a specific vehicle based on a packet header of the communication. The processing unit 41 is configured to identify the specific device of the at least one device in the specific vehicle based on the packet header of the communication.

According to some of the example embodiments, the packet header comprises a set of designated IPv6 addresses or DHCP. Thus, based on the identification of an IPv6 address or DHCP, the CVSC GW will know the specific device and specific vehicle.

Example Operation 68

According to some of the example embodiments, the CVSC GW 9 is further configured to forward the communication to an operator identified in the communication. The processing unit 41 is configured to forward the communication to an operator identified in the communication. Example operation 68 is described further in relation to at least FIG. 8.

FIG. 11A is a flow diagram depicting example operations which may be taken by the backhaul user equipment 4 for providing a multiple operator radio access in-vehicle split femtocell in a wireless communications network as described herein. It should also be appreciated that FIG. 11A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

FIG. 11B is a module diagram depicting modules which may perform at least some of the operations of FIG. 11A.

Operation 70

The backhaul user equipment 4 is configured to send 70, to a CVSC GW 9, a connectivity request for at least one device 1, 2, 19 inside a vehicle and being served by a CVSC 3. The connectivity request comprises an indicator indicating the at least one device is configured for communications via the multiple operator radio access in-vehicle femtocell. The transmitter 55 is configured to send, to the CVSC GW, the connectivity request for the at least one device inside of the vehicle and being served by the CVSC. The sending module 70A is configured to perform operation 70.

According to some of the example embodiments, the indicator may be in the form of an APN, a cause code or a flag. The indicator may be used to put the CVSC GW on notice that the device is configured for such communications.

Example Operation 72

According to Some of the Example Embodiments, the Backhaul UE 4 is Further configured to send 72, to the CVSC GW 9, a communication via a backhaul link 5. The communication originates form at least one device 1, 2, 9 and comprises PDCP PDUs. The communication further comprises an indication of a specific device of the at least one device in a specific vehicle, from which the communication originates from, within a packet header of the communication. The transmitter 55 is configured to send, to the CVSC GW, the communication via the backhaul link.

According to some of the example embodiments, the indication is a set of designated IPv6 addresses or DCHP. Thus, based on the identification of an IPv6 address or DHCP, the CVSC GW will know the specific device and specific vehicle.

Example Operation 74

According to some of the example embodiments, the sending described operations 70 and 72 is performed via a first macro base station 6 serving the backhaul UE 4. The backhaul UE 4 is further configured to undergo 74 a handover procedure such that the backhaul user equipment is served by a second macro base station 14. The handover procedure is performed such that a connectivity between the backhaul user equipment and the CVSC GW and a connectivity between the backhaul user equipment and the CVSC remains unchanged as a result of the handover procedure. The processing unit 51 is configured to undergo the handover procedure such that the backhaul UE is served by the second macro bas station 14. Operation 74 is described further in at least relation to FIG. 8.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following non-limiting summary of example embodiments.

The invention claimed is:

1. A method, in a Connected Vehicle Small Cell Gateway (CVSC GW), for providing a multiple operator radio access in-vehicle split femtocell in a wireless communications network, the method comprising:
   receiving, from a backhaul user equipment, a connectivity request for at least one device inside a vehicle and being served by a CVSC, said connectivity request comprising an indicator;
   determining that the at least one device is configured for communications via the multiple operator radio access in-vehicle split femtocell based on the indicator; and
   terminating communications from the at least one device in a Packet Data Network Gateway (PGW) in which the CVSC GW is situated in.

2. The method of claim 1, wherein the indicator is an Access Point Name (APN), a cause code, or a flag.

3. The method of claim 1, further comprising:
   receiving, from the backhaul user equipment, a communication originating from the at least one device via a backhaul link, the communication comprising Packet Data Convergence Protocol Protocol Data Units (PDCP PDUs); and
   forwarding the communication to an operator identified in the communication.

4. The method of claim 3, wherein the receiving and forwarding further comprise:
   identifying a specific device of the at least one device in a specific vehicle based on a packet header of the communication.

5. The method of claim 4, wherein the packet header comprises a set of designated Internet Protocol version 6 (IPv6) addresses or Dynamic Host Configuration Protocol (DHCP).

6. A Connected Vehicle Small Cell Gateway (CVSC GW) for providing a multiple operator radio access in-vehicle split femtocell in a wireless communications network, the CVSC GW comprising a processor and a memory, said memory comprising instructions executable by said processor whereby said CVSC GW is operative to:
   receive, from a backhaul user equipment, a connectivity request for at least one device inside a vehicle and being served by a CVSC, said connectivity request comprising an indicator;
   determine that the at least one device is configured for communications via the multiple operator radio access in-vehicle split femtocell based on the indicator; and
   terminate communications from the at least one device in a Packet Data Network Gateway (PGW) in which the CVSC GW is situated in.

7. The CVSC GW of claim 6, wherein the indicator is an Access Point Name (APN), a cause code, or a flag.

8. The CVSC GW of claim 6, wherein the CVSC GW is further operative to:
   receive, from the backhaul user equipment, a communication originating from the at least one device via a backhaul link, the communication comprising Packet Data Convergence Protocol Protocol Data Units (PDCP PDUs); and
   forward the communication to an operator identified in the communication.

9. The CVSC GW of claim 8, wherein the CVSC GW is further operative to identify a specific device of the at least one device in a specific vehicle based on a packet header of the communication.

10. The CVSC GW of claim 9, wherein the packet header comprises a set of designated Internet Protocol version 6 (IPv6) addresses or Dynamic Host Configuration Protocol (DHCP).

11. A method, in a backhaul user equipment, for providing a multiple operator radio access in-vehicle split femtocell in a wireless communications network, the method comprising:

sending, to a Connected Vehicle Small Cell Gateway (CVSC GW), a connectivity request for at least one device inside a vehicle and being served by a CVSC, the connectivity request comprising an indicator indicating that the at least one device is configured for communications via the multiple operator radio access in-vehicle split femtocell.

12. The method of claim 11, wherein the indicator is an Access Point Name (APN), a cause code, or a flag.

13. The method of claim 11, further comprising:

sending, to the CVSC GW, a communication via a backhaul link, the communication originating from the at least one device and comprising Packet Data Convergence Protocol Protocol Data Units (PDCP PDUs), wherein the communication further comprises an identification of a specific device of the at least one device in a specific vehicle, from which the communication originates, within a packet header of the communication.

14. The method of claim 13, wherein the identification is a set of designated Internet Protocol version 6 (IPv6) addresses or Dynamic Host Configuration Protocol (DHCP).

15. The method of claim 13, wherein the sending and/or the sending to the CSVC GW is performed via a first macro base station serving the backhaul user equipment, the method further comprising:

undergoing a handover procedure such that the backhaul user equipment is served by a second macro base station, wherein a connectivity between the backhaul user equipment and the CVSC GW and a connectivity between the backhaul user equipment and the CVSC remain unchanged as a result of the handover procedure.

16. A backhaul user equipment for providing a multiple operator radio access in-vehicle split femtocell in a wireless communications network, the backhaul user equipment comprising a processor and a memory, said memory comprising instructions executable by said processor whereby said backhaul user equipment is operative to:

send, to a Connected Vehicle Small Cell Gateway (CVSC GW), a connectivity request for at least one device inside a vehicle and being served by a CVSC, the connectivity request comprising an indicator indicating that the at least one device is configured for communications via the multiple operator radio access in-vehicle split femtocell.

17. The backhaul user equipment of claim 16, wherein the indicator is an Access Point Name (APN), a cause code, or a flag.

18. The backhaul user equipment of claim 16, wherein the backhaul user equipment is further operative to send, to the CVSC GW, a communication via a backhaul link, the communication originating from the at least one device and comprising Packet Data Convergence Protocol Protocol Data Units (PDCP PDUs), and wherein the communication further comprises an identification of a specific device of the at least one device in a specific vehicle, from which the communication originates, within a packet header of the communication.

19. The backhaul user equipment of claim 18, wherein the identification is a set of designated Internet Protocol version 6 (IPv6) addresses or Dynamic Host Configuration Protocol (DHCP).

20. The backhaul user equipment of claim 16, wherein the backhaul user equipment is operative to send the connectivity request to the CSVC GW via a first macro base station serving the backhaul user equipment, the backhaul user equipment is further operative to:

undergo a handover procedure such that the backhaul user equipment is served by a second macro base station, wherein a connectivity between the backhaul user equipment and the CVSC GW and a connectivity between the backhaul user equipment and the CVSC remain unchanged as a result of the handover procedure.

* * * * *